(12) United States Patent
Baer

(10) Patent No.: US 11,734,513 B2
(45) Date of Patent: Aug. 22, 2023

(54) DATA ASSOCIATION AND LINKING SYSTEM AND APPARATUS

(71) Applicant: Soul Baer, Seattle, WA (US)

(72) Inventor: Soul Baer, Seattle, WA (US)

(73) Assignee: Soul Baer, Seattle, WA (US)

( * ) Notice: Subject to any disclaimer, the term of this patent is extended or adjusted under 35 U.S.C. 154(b) by 412 days.

(21) Appl. No.: 16/926,708

(22) Filed: Jul. 12, 2020

(65) Prior Publication Data

US 2021/0019474 A1 Jan. 21, 2021

Related U.S. Application Data

(60) Provisional application No. 62/874,482, filed on Jul. 15, 2019.

(51) Int. Cl.

| | | |
|---|---|---|
| *G06F 3/04842* | (2022.01) | |
| *G06F 18/20* | (2023.01) | |
| *G06F 18/23* | (2023.01) | |
| *G06F 40/20* | (2020.01) | |
| *G06F 40/242* | (2020.01) | |
| *G06F 40/30* | (2020.01) | |
| *G06F 40/237* | (2020.01) | |
| *G06F 40/279* | (2020.01) | |
| *G06F 3/0482* | (2013.01) | |
| *G06F 18/22* | (2023.01) | |

(52) U.S. Cl.
CPC ............ *G06F 40/30* (2020.01); *G06F 3/0482* (2013.01); *G06F 18/22* (2023.01); *G06F 40/237* (2020.01); *G06F 40/279* (2020.01)

(58) Field of Classification Search
CPC .... G06F 40/237; G06F 3/0482; G06F 40/279; G06F 40/30; G06F 40/242; G06K 9/6215
USPC ............ 382/155–160; 704/1–275; 706/1–62
See application file for complete search history.

(56) References Cited

U.S. PATENT DOCUMENTS

| | | | | |
|---|---|---|---|---|
| 10,430,048 B2* | 10/2019 | Kunes | ................. | G06F 3/04842 |
| 2003/0041307 A1* | 2/2003 | Park | ...................... | G06F 40/242 |
| | | | | 715/275 |
| 2003/0067498 A1* | 4/2003 | Parisi | .................... | G06F 16/338 |
| | | | | 707/E17.082 |
| 2010/0131563 A1* | 5/2010 | Yin | ....................... | G06F 16/338 |
| | | | | 707/E17.014 |
| 2011/0066970 A1* | 3/2011 | Burrier | ................. | G06F 3/0484 |
| | | | | 715/802 |
| 2015/0142782 A1* | 5/2015 | Moon | ................. | G06F 16/5846 |
| | | | | 707/722 |
| 2016/0283589 A1* | 9/2016 | Bostick | .................. | G06Q 50/01 |

OTHER PUBLICATIONS

Luchene Andrew Van, Advertisement in a Database of Documents, 2008, WO/2008130404 (Year: 2008).*
Kim Seog Hwan; Studying Game System, Studying Game Method for Foreign Language Using Internet Having Profit Management Module;Mar. 30, 2016 (Year: 2016).*

* cited by examiner

*Primary Examiner* — Marcellus J Augustin
(74) *Attorney, Agent, or Firm* — Frank Washko

(57) ABSTRACT

A method of linking data is disclosed. The method comprises receiving and analyzing an anchor word and determining one or more related words to the anchor word using one or more data sources. Further, the method comprises displaying the anchor word and the one or more related words in a graphical user interface (GUI) in a display, wherein the one or more related words are clustered around the anchor word.

12 Claims, 12 Drawing Sheets exultant [adj]

prefix
ex-
e-
ef-
es-

: out (of)
: away from without
intensive exacerbate
excise
exclusive
exculpate
exodus
expatriate
expurgate
extenuating
extort
expurgate

Definition
filled with or expressing great joy or triumph : jubilant

Examples
Researchers are *exultant* over the new discovery.

exultance *n.*
exultancy = exultation
exultantly *adv.*
exulted *v.*
exulting *adj.*
exultingly *adv.*
- Exultet

*Synonyms*
crowing
exulting
glorying
jubilant
prideful
proud
rejoicing
triumphant

*Antonyms*
crestfallen
defeated
dejected
depressed
disconsolate
dispirited
downcast

Figure 5

FIGURE 6
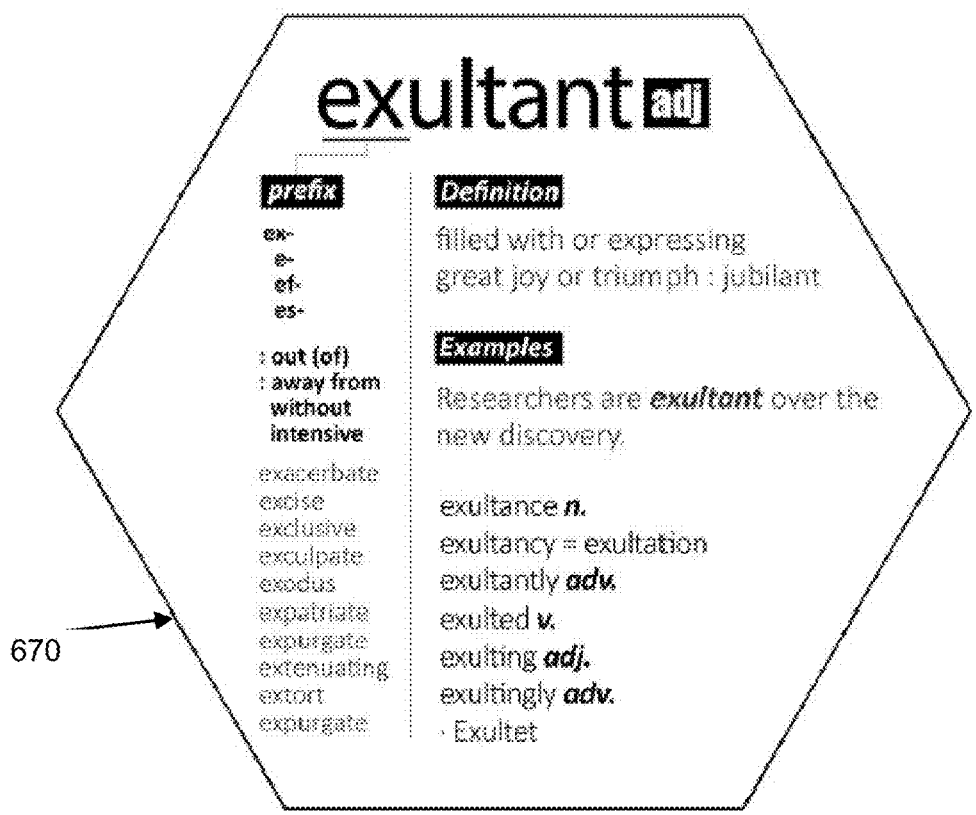
670
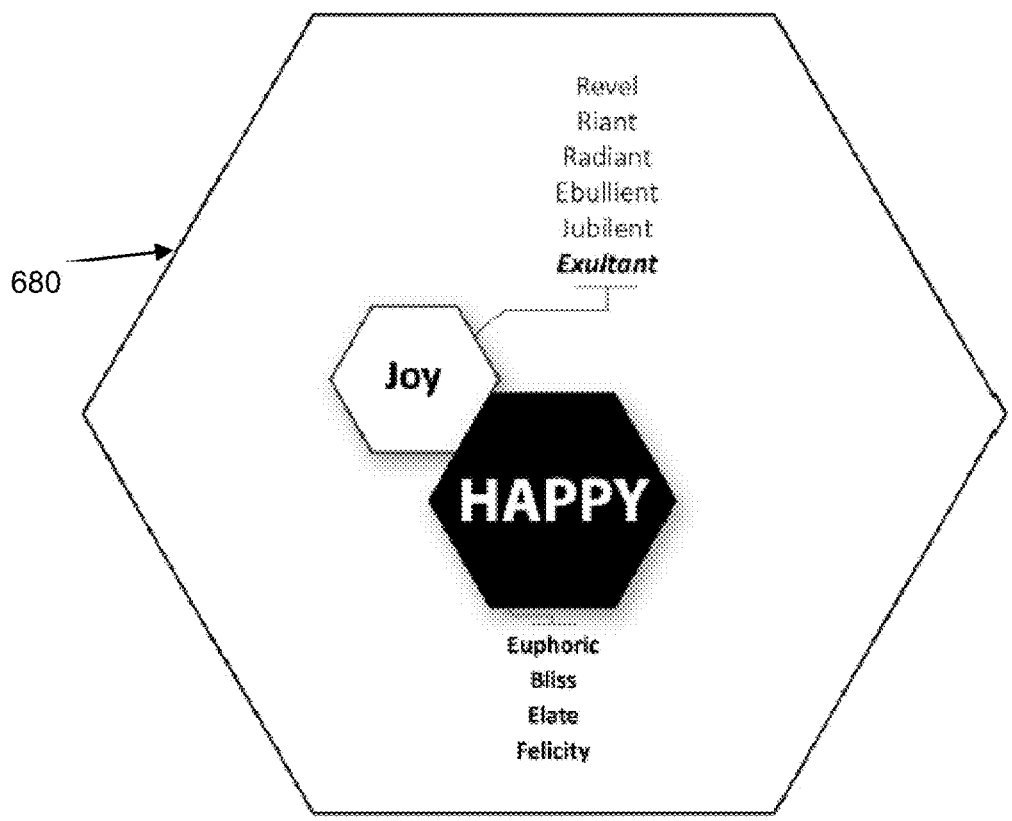
680

DATA ASSOCIATION AND LINKING SYSTEM AND APPARATUS

CROSS-REFERENCE TO RELATED APPLICATION

This application claims priority benefit of U.S. Provisional Patent Application No. 62/874,482 entitled "Data Association and Linking System," filed Jul. 15, 2019. The disclosure in that application is incorporated herein in its entirety.

FIELD OF THE INVENTION

The present invention relates generally to linking data items by associated characteristics, and more particularly to a vocabulary learning interface system.

BACKGROUND

Vocabulary learning has typically been a memorization method. Vocabulary learning typically comprises being provided with a single cue word and its definition or definitions with other information such as pronunciation, part of speech, sentence examples, and more as properties of the given cue word. However, traditional vocabulary learning systems, e.g., software, smart-phone applications, etc. do not provide any collective or related vocabulary learning methods that expands on the cue word or extends it in any way. Further, besides vocabulary learning systems, other traditional learning systems also do not reference a variety of different data types during a learning process.

SUMMARY OF THE INVENTION

Accordingly, a need exists for an apparatus and/or method that addresses the problems with the approaches described above. Using the beneficial aspects of the apparatus and/or method described, without their respective limitations, embodiments of the present disclosure provide novel solutions to address these problems.

Embodiments of the present invention solve these problems and others by providing a system of graphically introducing, linking, and learning associated data sets and points. In the example of vocabulary learning, embodiments of the present invention enhance the linking and learning of associated vocabulary words using visualized graphics. Embodiments of the present invention also provide a method of relational vocabulary learning, wherein relational vocabulary learning comprises learning by structure and meanings from one anchor or topic word to encompass inclusive and collective vocabulary empowerment. In other words, relational vocabulary learning involves analyzing the structure and meaning of an anchor word (or a topic word) to discover other related inclusive vocabulary words.

In a non-limiting example, a preferred embodiment of this system and method may enhance vocabulary learning by using visual graphics aided by the use of polygons, lines, and colors for each topic or anchor word. For example, the graphical user interface (GUI) presented to a user may present the anchor word encapsulated by one type of polygon (e.g., a square, rectangle, rhombus, etc.) and display connections using lines and colors to other types of associated or related vocabulary words. In an embodiment, the anchor word related vocabulary may be collectively presented and clustered based on the extension and expansion. In one embodiment, related vocabulary data items may be presented in a relational representation comprising both the anchor word's synonyms and antonyms. Thereafter, in one embodiment, the closest data points may be clustered around the anchor word. Further, in one embodiment, related vocabulary to each of these closest data points may be connected to each of the respective data points using a visual representation, e.g., lines, arrows, dots, etc.

In one embodiment, a method of linking data is disclosed. The method comprises receiving and analyzing an anchor word and determining one or more related words to the anchor word using one or more data sources. Further, the method comprises displaying the anchor word and the one or more related words in a graphical user interface (GUI) in a display, wherein the one or more related words are clustered around the anchor word.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 5 illustrates a study card that displays a word, its associated properties and associated information developed through a learning process in accordance with an embodiment of the present invention.

FIG. 6 illustrates the front and back sides of a hexagonal study card displayed through a GUI, wherein the front side displays an anchor word and its associated properties while the back side displays the anchor word cluster in accordance with an embodiment of the present invention.

DETAILED DESCRIPTION

Figure 1:
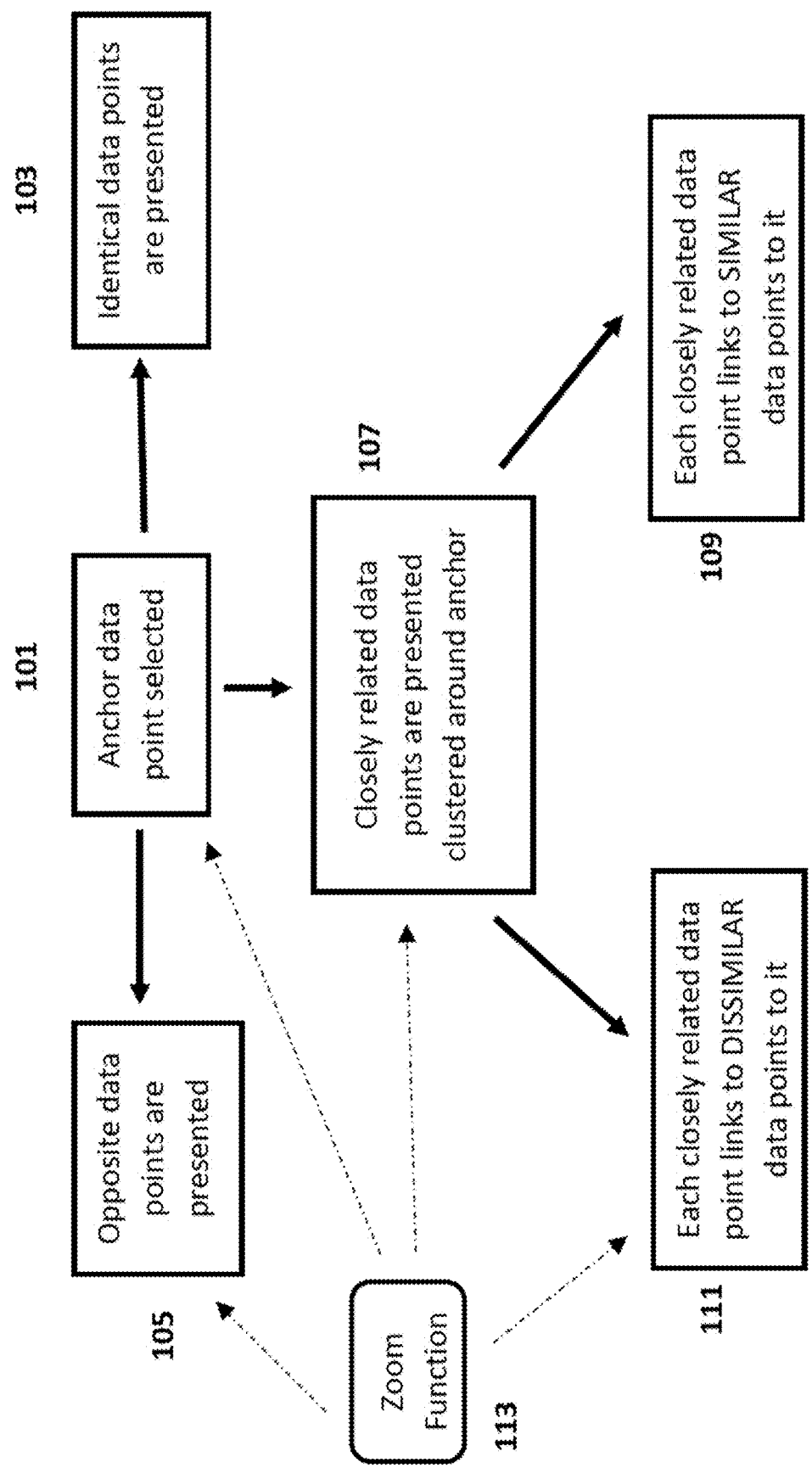
FIG. 1 illustrates an exemplary flow diagram of the data association and linking method in accordance with an embodiment of the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Embodiments of the present invention solve these problems and others by providing a system of graphically introducing, linking, and learning associated data sets and points. In the example of vocabulary learning, embodiments of the present invention enhance the linking and learning of associated vocabulary words using visualized graphics. Embodiments of the present invention also provide a method of relational vocabulary learning, wherein relational vocabulary learning comprises using the structure and meaning of one anchor or topic word to learn and encompass related and collective vocabulary. In other words, relational vocabulary learning involves analyzing the structure and meaning of an anchor word (or a topic word) to discover other related inclusive vocabulary words.

In a non-limiting example, a preferred embodiment of this system and method may enhance vocabulary learning by using visual graphics aided by the use of polygons, lines, and colors for each topic or anchor word. For example, the graphical user interface (GUI) presented to a user may present the anchor word encapsulated by one type of polygon (e.g., a square, rectangle, rhombus, etc.) and display connections using lines and colors to other types of associated or related vocabulary words. In an embodiment, the anchor word related vocabulary may be collectively presented and clustered based on the extension and expansion of the anchor word or topic. In one embodiment, related vocabulary data items may be presented in a relational representation comprising both the anchor word's synonyms and antonyms. Thereafter, in one embodiment, the closest data points may be clustered around the anchor word. Further, in one embodiment, related vocabulary to each of these closest data points may be connected to each of the respective data points using a visual representation, e.g., lines, arrows, dots, etc.

Embodiments of the present invention may also provide a system for presenting and associating data points with other similar, and dissimilar, data points. Subsequently, embodiments of the present invention may present similar and dissimilar data points for each of those respective data points, so that a user can easily be presented with data two generations removed from the original "anchor" point. The data is quickly and visually linked as the user moves one, and two, generations out from the anchor data point, so that the family of data points are readily learned. For example, embodiments of the present invention may associate a word with its synonyms and antonyms. Additionally, each synonym and antonym may be linked with its respective synonyms and antonyms.

FIG. 1 illustrates an exemplary flow diagram of the data association and linking method in accordance with an embodiment of the present invention. FIG. 1 illustrates that at block 101, an anchor data point may be selected or presented to the user. From this data point, identical, or nearly identical, data points at block 103 may be visually presented near the anchor data point. This may be either adjacent to the anchor data point, or connected via a line, arrow or another visual object. Also, at block 105, opposite, or nearly opposite, data points may be presented near the anchor data point, at a different location than the identical (or closely related) data points. Each of the anchor data points, the identical data point(s) and the opposite data point(s) may be visually encapsulated in a polygon or some other shape.

In one embodiment, one generation removed from the anchor point, closely related data points determined at block 107 may be clustered around the anchor data point. Each data point in these clusters may be surrounded by a circle, polygon or any other shape and presented to a user through a GUI. In another embodiment, the size of the polygon may indicate how closely related the related data point is related to the anchor data point.

In an embodiment, the identical, or nearly identical, data points determined at block 103 may be presented near the anchor data point 109. And, also, opposite, or nearly opposite, data points (generated at block 105) may be presented near the anchor data point, at a different location than the identical data points. The identical or opposite data points may be visually presented near or adjacent to the anchor data point, or connected via a line.

In an embodiment, opposite data points (at block 105) and identical data points (at block 103) are generated and populated around the closely related data points (generated at block 107) in the GUI. In other words, the opposite data points and identical data points may be populated around the respective closely related data points and connected in the GUI (using arrows, lines, etc.). In an embodiment, opposite data points or identical data points may be generated for each of the closely related data points and populated around the respective closely related data points.

In an embodiment, at block 111 each closely related data point determined at block 107 is linked to data points that are dissimilar to the respective closely related data point. Similarly, at block 109, each closely related data point determined at block 107 is linked to data points that are similar to the respective closely related data point. Accordingly, embodiments of the present invention provide data points that are two generations removed from the anchor point determined at block 101.

Besides vocabulary learning, embodiments of the present invention may be advantageously used to analyze the contents of a paper or a book and present results to the editor of the paper or book. The editor may be able to determine how many times a particular anchor word or other words related to the anchor word were used in the paper or book. Furthermore, the editor may be able to determine how many words that are two generations away from a particular anchor word were used. This allows an editor or reviewer to determine the general tenor of the paper or book. For example, the editor can search for the word "happy" and receive a list of the closely related word set and the number of occurrences for each closely related word. Furthermore, embodiments of the present invention can also provide a list of data points (or words) that are similar to each of the closely related words or dissimilar to the closely related word and the number of occurrences of each. By providing this functionality, a user using a notebook, laptop, desktop, tablet, or phone, may be able to quickly review a book or document and determine the theme or tenor of a book or paper. Further, it allows the user to explore the book based on a theme of interest. For example, if the user is interested in plants, the user may search "plant" and receive a list of closely related words and also words that are similar and dissimilar to each of the closely related words (e.g., words that are two generations removed).

In another embodiment, different shapes, such as circles or hexagons, may be used for different data points, different levels, different types of data, or other different categories, to differentiate data for users. Also, different sizes of shapes may be used to determine closer or further data points. Similarly, lines connecting data sets may be used that are longer or thicker to determine how similar, or dissimilar, different data sets are from anchor or related data points. These visual design cues may enhance the usability of the system. Or, the distance of a polygon from the anchor data point may indicate that the cluster is less closely related to the anchor data point than other polygons in the cluster. Finally, in yet another embodiment, a zoom function may be implemented at block 113, for example, whereby any individual data point can be selected by the user to get more extensive information about the data point—at any level of the system. The complete set of data, with relationships and levels between the data points, may be called a relational matrix.

In one embodiment of this system, the system and method may be applied to a vocabulary system. This could be used for learning vocabulary, for finding related words and word options, or other vocabulary uses. In this system, an anchor word may be presented to the user or selected by the user. Synonyms may be listed in close proximity or adjacent to the anchor word, and similarly antonyms may be listed in close proximity or adjacent to the anchor word. Then, related words may be clustered around the anchor word using polygons. The closeness of the related words may be indicated by either the size of a respective polygon in the cluster, or the distance from the center of the cluster, or both. In an embodiment, a line may connect a related word polygon to synonyms and antonyms of that related word. Finally, the user may zoom in at block 113 on any specific word by selecting a polygon of that specific word, where there is more extensive information about that word, including definition, word origin, pronunciation, or any other information about the word.

This example of a vocabulary system may be implemented in GUI through the display of a laptop, notepad, cellular-phone, or tablet screen. In that format, the anchor word may be on a display page. And, synonym and antonyms may be linked to the anchor word by lines. Closely related words may be clustered around the anchor word, in hexagons, for example. Then, lines may connect each hexagon to synonyms and antonyms of the respective closely related word. The user may then optionally focus on any of the specific related words in the cluster, e.g., by double-clicking or right-clicking a word in the cluster, which then results in the GUI switching to a different page that uses the selected word as the anchor word, and presents clusters for that word. Finally, as another option, a user may choose to zoom in on any word in the matrix of anchors, synonyms, antonyms, or closely related words, by selecting an individual hexagon card for that specific word, which may display more extensive information about that word, as described above. The same process may be conducted for a closed set of words, e.g., a paper, book, article etc. which allows a user to discover other words that are closely related to a selected anchor word.

In one embodiment of the system, the vocabulary system described above may be implemented in a visual data display or computer system, operating on a computer, laptop, tablet, smartphone, reader, or any other similar device. In that system, a user may select an anchor word, or one may be selected for her. Then, the user may select to see synonyms or antonyms. The user may also select to see the closely related word clusters. In an optional embodiment, the user may zoom in or out of the vocabulary matrix by zooming in or out of the matrix and the related word clusters by using the display of the interface, such as by pinching, or other gesture. In another embodiment, the user may move to different aspects, words, or topics of the matrix by using the visual interface to drag to different parts of the matrix. Finally, the user may zoom in on any specific word to get more detailed information about that word by picking that word.

The software system described above may be implemented on any type of device. In this software system, the complete data set may be stored directly in the code of the software, in a database, or in a cloud. In this way, a user may pan, zoom, or select different datapoints, or anchor words, from a fixed set of data points, and a fixed set of relational matrices.

In a different embodiment of the system, the data sets, and the relational matrices may be dynamic. In such a system, a user may select, input, or upload a piece of data. Then, the system may dynamically find similar and dissimilar data points to this anchor data point. And, the system may dynamically create a cluster of closely related data points one level removed from the anchor data point. And, the system may then draw lines from the closely related data points to similar and dissimilar data points related to those. The system may also dynamically size, or otherwise differentiate, the shape of the closely related data point in the cluster to visually represent how related the closely related data point is to the anchor data point. Finally, in yet another embodiment of the system, the dynamic software system may create the relational matrix using machine learning or artificial intelligence algorithms to dynamically determine the most appropriate related data points to display for the particular data point. The software system may do this by using criteria, such as information about the user, or information about the data, or a combination of these criteria with other criteria, to determine the relational matrix that may be the most relevant or useful to the user.

In an embodiment, instead of an anchor word, a topic may be selected at block 101. The system may then find related topical words or sentences, for example, at block 107 in FIG. 1. The related topics or sentences may be searched, for example, in a book, article, or paper. Further, the system may dynamically create a cluster of closely related topical sentences or words one level removed from the anchor topic. And, the system may then draw lines from the closely related topics to similar and dissimilar topics related to the closely related topic (e.g., at blocks 111 and 109 as shown in FIG. 1). The system may also dynamically size, or otherwise differentiate, the shape of the closely related topic in the cluster to visually represent how related the closely related topical sentence or set of words is to the anchor topic.

In the context of the vocabulary system, the dynamic software system described above may allow a user to input a word as an anchor word. Then, the system may dynamically determine words that are related to the anchor word, then cluster these closely related words around the anchor word, using geometry differentiation to display the closeness. And, the system may use any criteria or information about the user, such as his age, or intelligence, or education, or interests, or any other useful data, to dynamically determine which words to display in the cluster that will be more interesting or useful to the user. Similarly, the dynamic software system may allow a user to input a word and use the anchor word to search a book, article, and paper to determine other related words. Alternatively, embodiments of the present invention may also allow a user to enter a topic and then use the topic to search for other related data words or topics in a book, article or paper.

Figure 2:
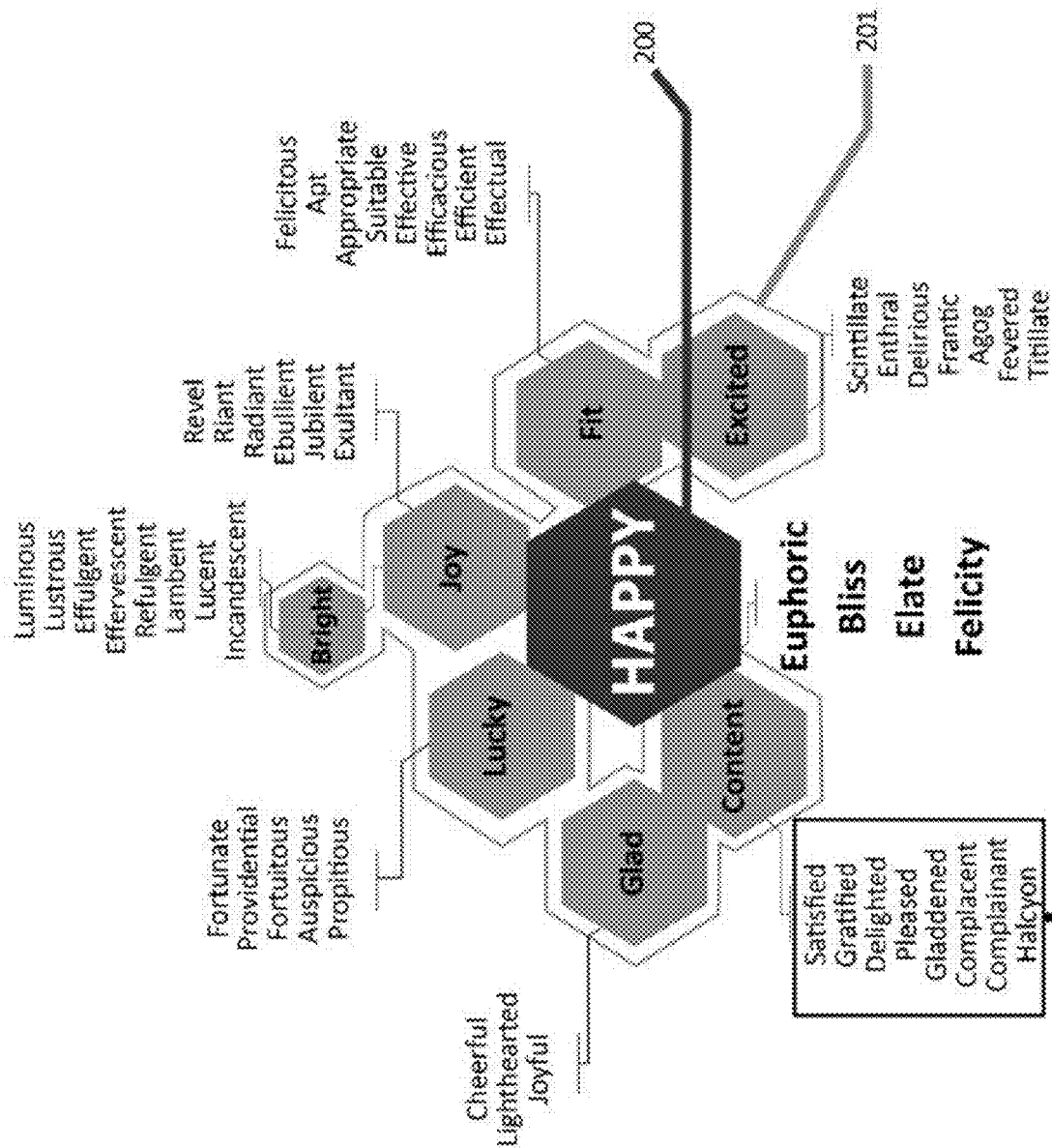
FIG. 2 illustrates a method of visually displaying words discovered through a process of vocabulary learning through a graphical user interface (GUI) in accordance with an embodiment of the present invention.

FIG. 2 illustrates a method of visually displaying words discovered through a process of vocabulary learning through a graphical user interface (GUI) in accordance with an embodiment of the present invention. FIG. 2 illustrates one possible embodiment of a topic and anchor word cluster map. In this word cluster map, an anchor word 200, "happy" is selected. This may be called a Topic or Anchor Word (TAW) for the purposes of this application. A closely related word 201, "excited," is presented in a hexagon, in a cluster of hexagons around the TAW. This may be called a Related or Derivative Word (RDW) for the purposes of this application. Finally, synonyms and/or antonyms 202 of the RDW may be linked to the RDW by a line.

Figure 3:
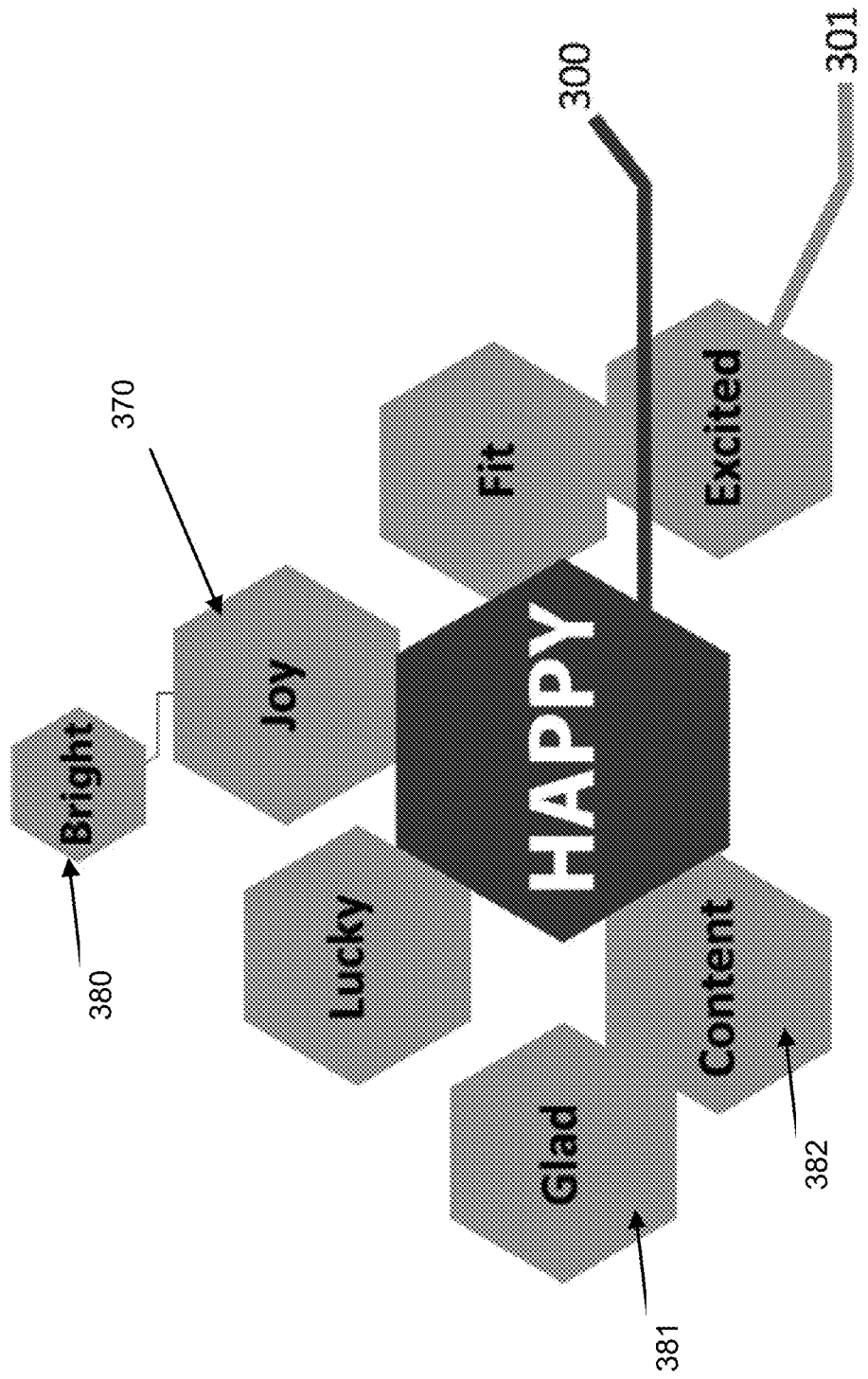
FIG. 3 illustrates a visual representation of an anchor word cluster determined through a process of vocabulary learning in accordance with an embodiment of the present invention.

FIG. 3 illustrates a visual representation of an anchor word cluster determined through a process of vocabulary learning in accordance with an embodiment of the present invention. In FIG. 3, an example of a word cluster is shown. In this example, the TAW 300 is shown with a cluster or RDWs 301 around the TAW. Note that in this optional embodiment, synonyms and antonyms of the TAW 300, are not listed by the TAW 300. They may be available by zooming into the TAW 300, using an electronic link. Further, in this embodiment, synonyms and antonyms of the RDW 301 also do not appear on the screen but may be accessible by zooming into any one of the RDWs. It should be noted that the more closely related the word, the closer it is displayed adjacent to the anchor word "happy" 300 and the bigger the polygon that is created around it. For example, the word "joy" 370 is more closely related to the word "happy" 300 than the word "bright" 380 is and, accordingly, the word "joy" 370 is displayed much closer to the word "happy" 300 than the word "bright" 380. Similarly, the word "glad" 381 is much closer in relation to the word "happy" 300 than the word "content" 382.

Figure 4:
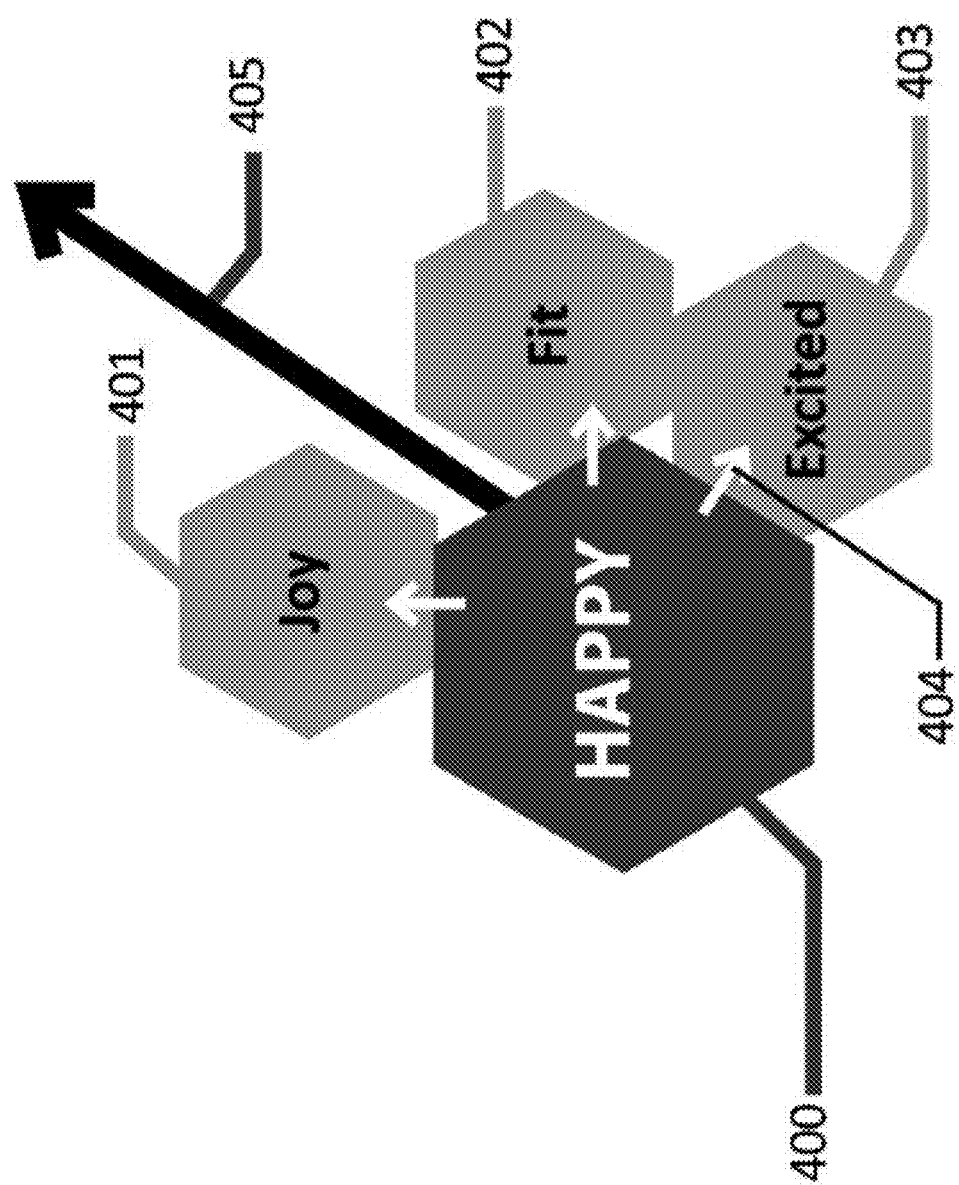
FIG. 4 illustrates the construction of an anchor word (or topic) and its extension in accordance with an embodiment of the present invention.

FIG. 4 illustrates the construction of an anchor word (or topic) and its extension in accordance with an embodiment of the present invention. FIG. 4 shows another embodiment of the system, wherein expansion and extension of the data cluster map is implemented. In this embodiment, a TAW 400 may be selected. Then, an RDW 401 may be placed near the TAW. The various other RDW's, 402 and 403, may be clustered with 401 around the TAW 400. Then, in this embodiment, lines may be used to further explain the map. Here, an extension line 404 may be used to show the link of a TAW 400 to an RDW 403. And, an expansion line 405 may be extended from the TAW 400. The expansion line 405 may link the RDW to alternate words that are further related to the TAW 400, but not closely related like the RDW's are. Thus, the expansion links to another level of the relational matrix, one level removed beyond the cluster. In yet another embodiment, within a GUI, the user may click on the extension line 404 or the expansion line 405, for further information about the relationship that the line represents.

FIG. 5 illustrates a study card that displays a word, its associated properties and associated information developed through a learning process in accordance with an embodiment of the present invention. FIG. 5 shows an exemplary embodiment of a display presented to a user through a GUI when zooming in on a specific data point. In this example, a user may zoom in on a specific word, which can be a TAW or an RDW, to get additional information about the specific word. Details of the specific word may be available via an electronic link. In this embodiment, the synonyms and antonyms may be listed on the study card, but in an alternate embodiment, those synonyms and antonyms may be listed in the word cluster in close proximity to the TAW.

FIG. 6 illustrates the front and back sides of a hexagonal study card displayed through a GUI, wherein the front side displays an anchor word and its associated properties while the back side displays the anchor word cluster in accordance with an embodiment of the present invention. FIG. 6 shows another embodiment of a study card displayed through a GUI, in which the study card is hexagonal. In this embodiment, the zoomed in information (e.g. the word, its associated properties and associated information as discussed in connection with FIG. 5) is shown on one side of the study card 670. And, a word cluster using the subject anchor word is shown on the opposite side of the study card 680.

Figure 7:
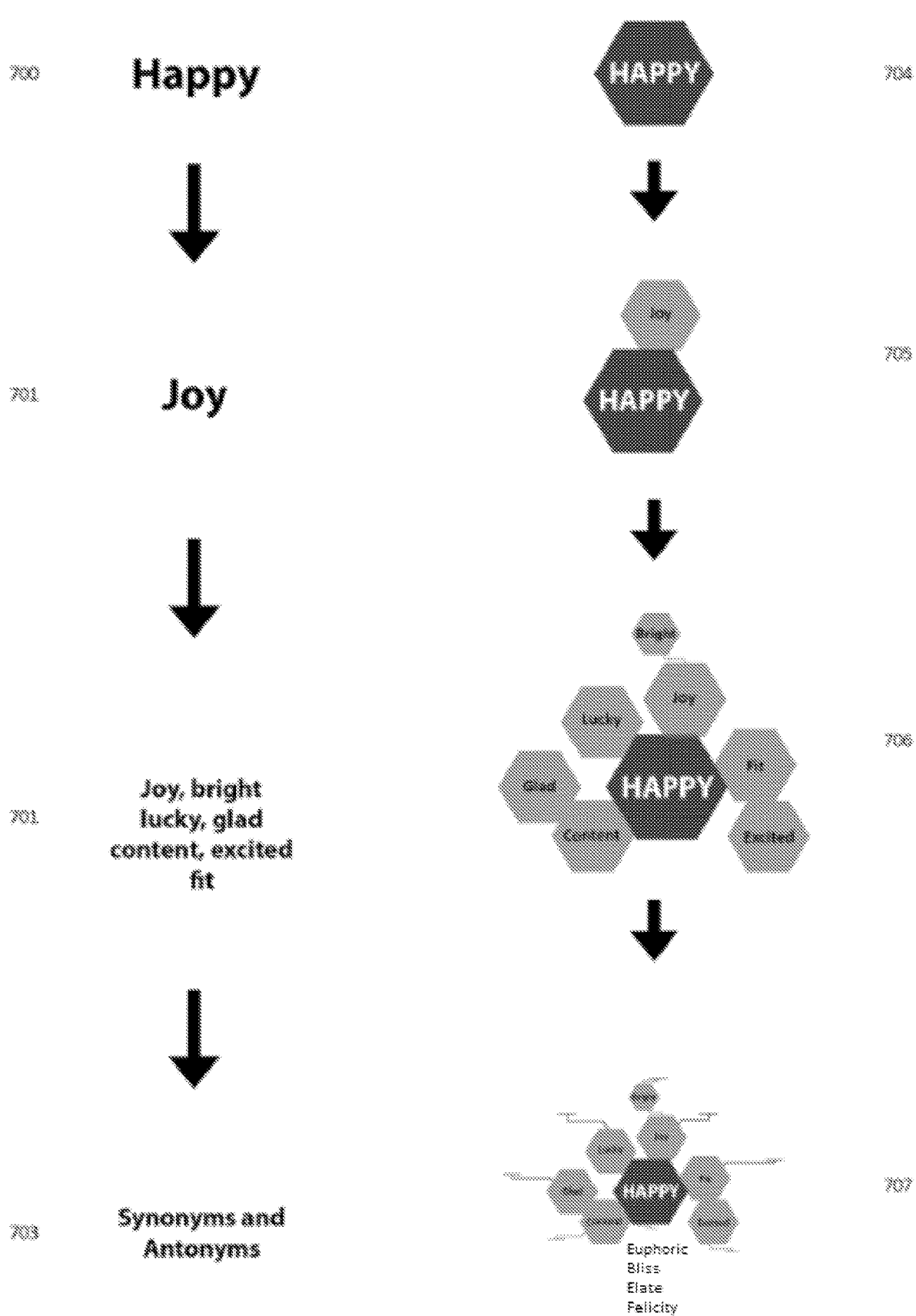
FIG. 7 illustrates a method of analyzing structural content for a word and conducting a vocabulary development process in accordance with an embodiment of the present invention.

FIG. 7 illustrates a method of analyzing structural content for a word and conducting a vocabulary development process in accordance with an embodiment of the present invention. In this embodiment, a TAW 700 is selected at step 700. From the TAW 700, an RDW 701 is generated at step 701. Then, a number of other RDW's 701 may be generated at step 702. From there, synonyms and antonyms 703 may be linked to the RDW's at step 703.

In one embodiment, in a graphical format, at step 704, the TAW 704 may be presented in a large, dark hexagon. Then, at step 705, an RDW 705 may be placed near the TAW 704 in a lighter, smaller hexagon. Then, at step 706, other RDWs 706 may be clustered around the TAW 704, with different sizes and at varying distances from the TAW 704. Notice that in this embodiment, a second level of RDW is linked in a smaller hexagon, further out from the TAW (as also discussed in connection with FIG. 3). Therefore, a second, or further, more subsequent, levels of closely related words, or RDWs, may be associated with the TAW. Finally, at step 707, synonyms and antonyms for RDWs may be linked with lines to the respective RDWs. In this embodiment, similar/different words may also be linked directly to the TAW.

Figure 8:
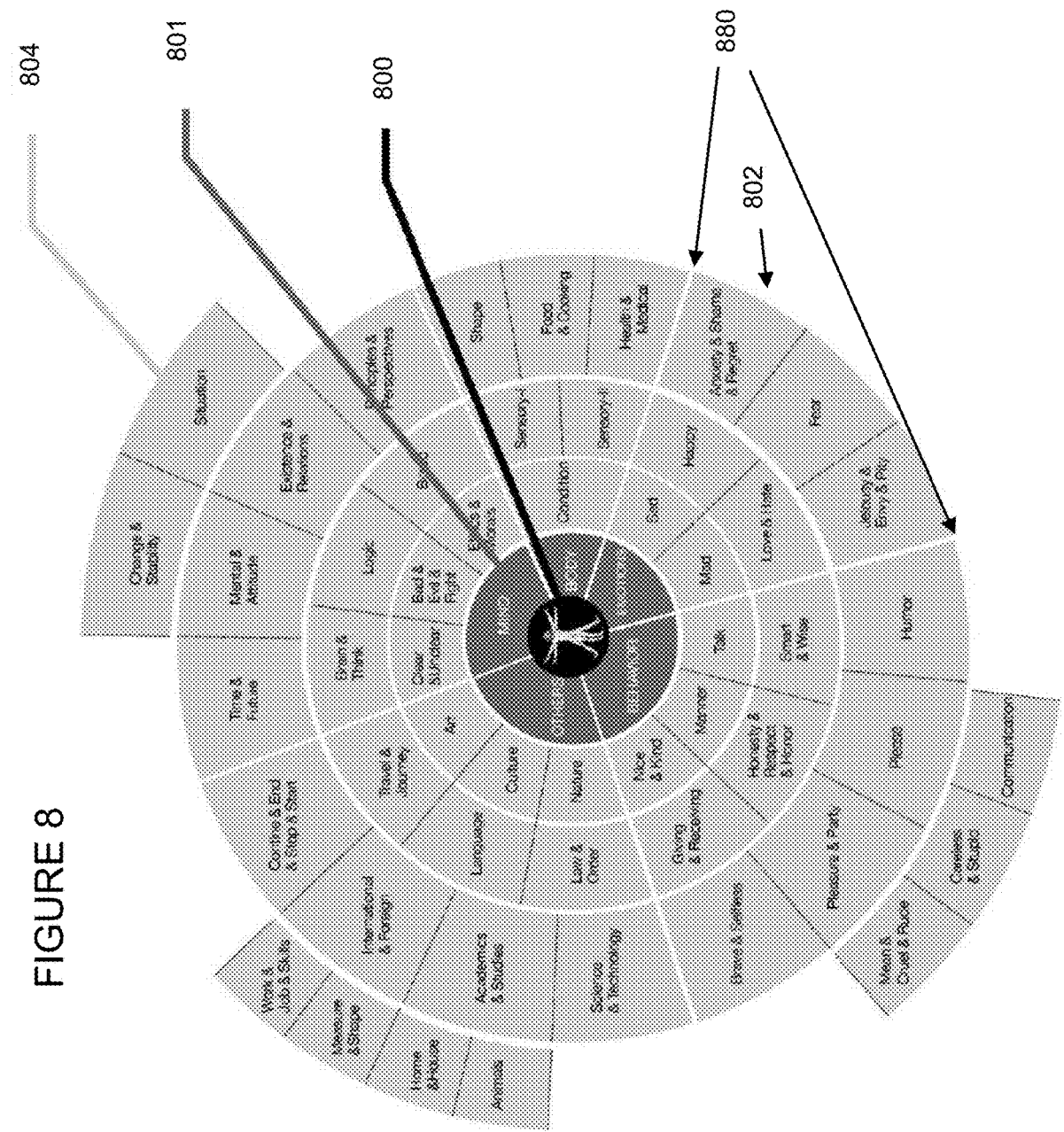
FIG. 8 illustrates an embodiment of a high-level visualized topic map, or a map of available data or word clusters that a user can select to use in accordance with an embodiment of the present invention.

FIG. 8 illustrates an embodiment of a high-level visualized topic map, or a map of available data or word clusters that a user can select to use in accordance with an embodiment of the present invention. FIG. 8 shows a Vitruvian man 800, at the center of the map. Extending from the center, this example has five subsequent categories, e.g., 801 (namely, mind, body, emotions, behavior and others). Then, each of these categories has a sector 802 that is delineated by lines 880, as a segment of the circle. Within each of the sectors (e.g., sector 804), there are a variety of topics related to the respective category (e.g. "mind"). The user can then select one of the topics to focus on. In one embodiment of the present invention, a user may pick or electronically select a specific topic in a sector, then link to data or word options related to that topic. Embodiments of the present invention may advantageously be used to draw a visualized topic map of features in a book, article, or paper for a reviewer or editor to explore different topics of the respective publication. In an embodiment, the various topics may also be associated with a number of occurrences which provides a user some indication of the theme or ethos of a book.

Figure 9:
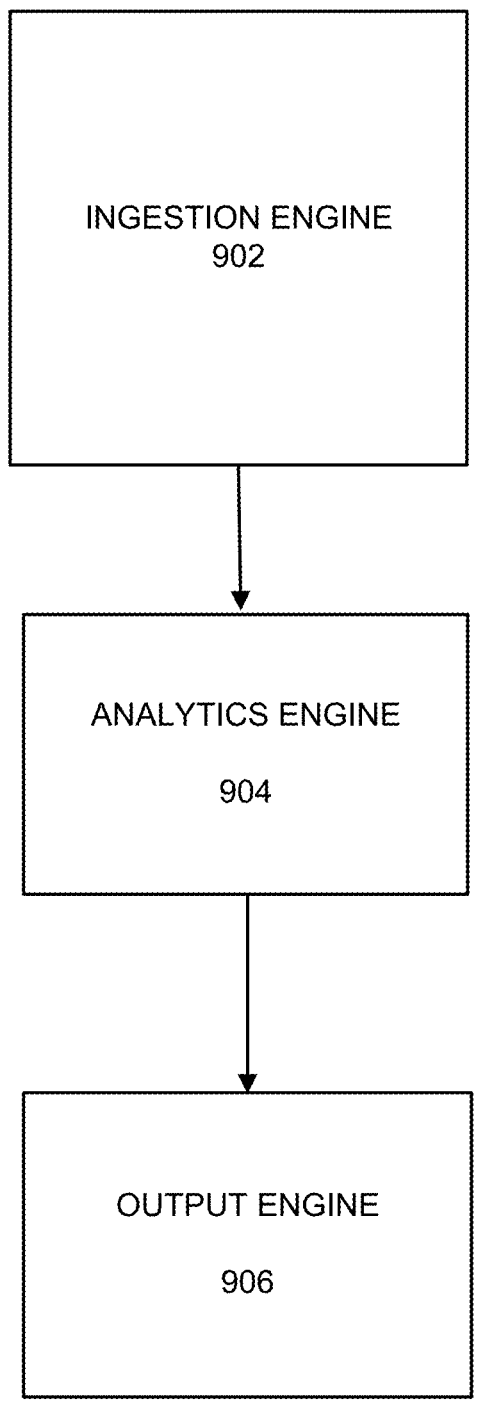
FIG. 9 illustrates a high-level flow diagram that illustrates the manner in which data can be collected and ingested for further analysis and outputted in a manner that is helpful to a user, in accordance with embodiments of the present invention.

FIG. 9 illustrates a high-level flow diagram that illustrates the manner in which data can be collected and ingested for further analysis and outputted in a manner that is helpful to a user, in accordance with embodiments of the present invention.

Ingestion engine 902 collects data from one or more sources. As mentioned above, the data may be from a dictionary, a book, a paper, an article, a journal, or a collection of different sources. For a standard vocabulary learning embodiment of the present invention, however, the ingestion engine 902 may simply ingest a word inputted by the user or highlighted by the user (for which the user intends to find related words and related information).

Analytics engine 904 analyzes the information ingested to determine an output for the user. If the user enters a word and the system comprises a vocabulary learning system, the analytics engine determines closely related data points to the word entered and further also determines similar and dissimilar data points to the closely related words (as discussed in FIG. 1). In a different embodiment, if the user intends to analyze a book, an article or some other source, the ingestion engine would ingest all the various sources and the analytics engine 904 would then analyze the various sources in connection with the 'word' or 'topic' the user wants to explore. For example, if a user wanted to explore a particular topic for a book, embodiments of the present invention would ingest and analyze the book. Thereafter, embodiments of the present invention would provide related topics to the topic entered by the user and, possibly, even topics that are two generations removed from the original topic entered by the user. For example, based on the topic entered by the user, the analytics engine could produce a topic map similar to the one shown in FIG. 8.

In one embodiment, a visualized topic map may be created for a book, an article, a paper or a collection of books. Alternatively, the user may input several different books or articles through a GUI in accordance with an embodiment of the present invention. Embodiments of the present invention may comprise an ingestion engine 902 that ingests all the materials and analyzes the words in all the source materials and thereafter, the analytics engine 904 produces a topical map similar to the one shown in FIG. 8. In one embodiment, the topical map may be based on one or more seed topics that the user inputs into the ingestion engine 902. For example, referencing FIG. 8, the user may enter one or more seed topics, e.g., mind, boy, emotions etc. Alternatively, embodiments of the present invention may also be configured to create a visualized topic map without requiring the user to enter any seed words or topics.

Referencing FIG. 9 again, output engine 906 visually displays the results to the user through a graphical user interface. In one embodiment, the output engine 906 may determine an appropriate way to display the information (e.g., the visual map shown in FIG. 8) and present it to the user through the GUI. In an embodiment, the output engine 906 may also connect the various words or topics displayed through the GUI, e.g., connecting related words to the anchor word using arrows.

Figure 10:
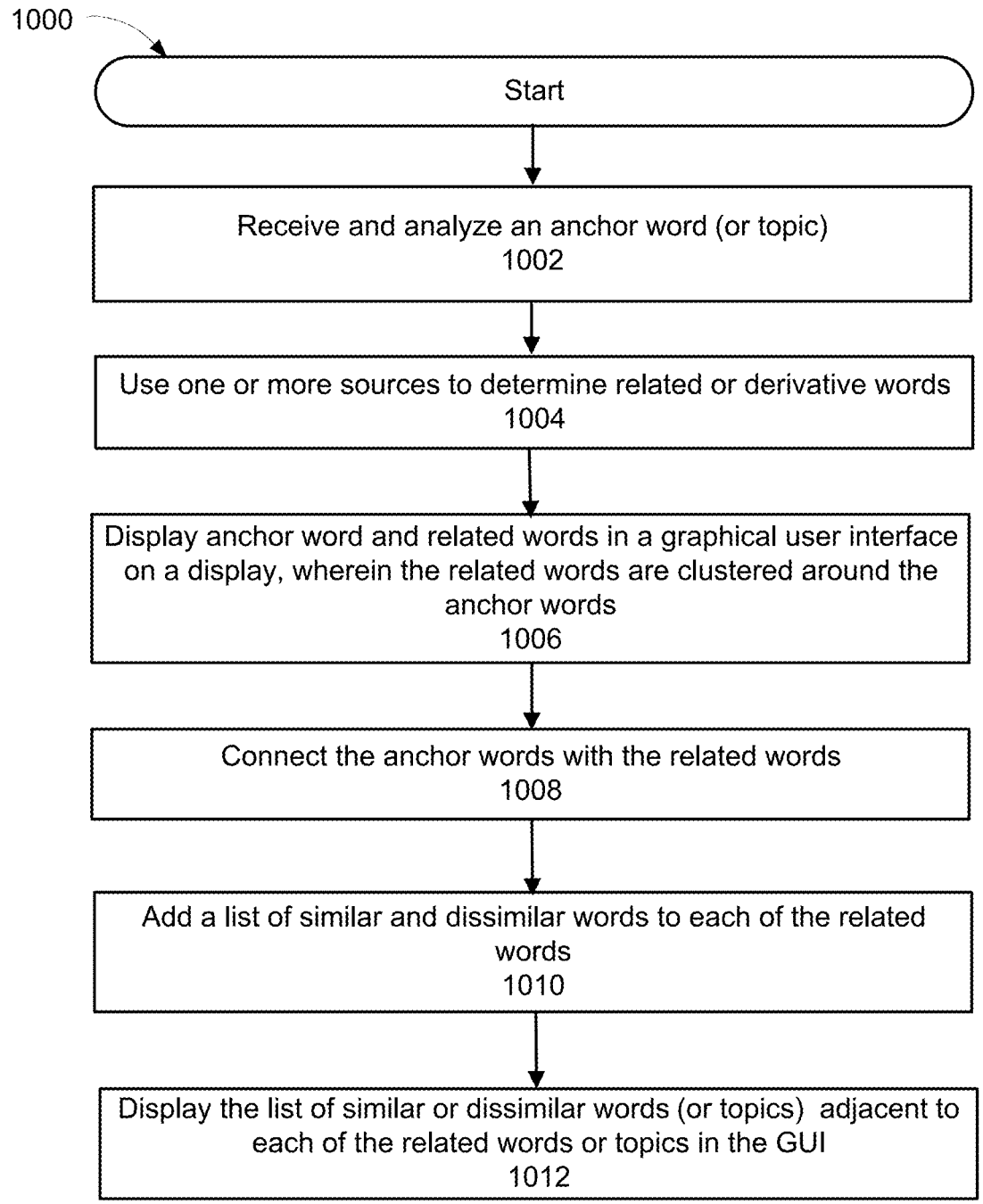
FIG. 10 illustrates a flowchart of an exemplary computer implemented process for analyzing the structural content of an anchor word or topic (TAW), using it to extract a related or derivative word and presenting it to a user through a graphical user interface in accordance with an embodiment of the present invention.

FIG. 10 illustrates a flowchart of an exemplary computer implemented process for analyzing the structural content of an anchor word or topic (TAW), using it to extract a related or derivative word and presenting it to a user through a graphical user interface in accordance with an embodiment of the present invention.

At step 1002, an anchor word (or topic) is received and analyzed. The anchor word may be manually inputted by a user. Alternatively, the user may select the word or topic through a GUI, e.g., displayed through a notepad, tablet, phone, etc. In an embodiment, analyzing an anchor word comprises analyzing a context within one or more data sources within which the word was used. For example, a word may have different connotations depending on the manner in which it is used in a sentence. Embodiments of the present invention will analyze a sentence structure, grammar, other sentences within proximity, etc. to determine a context for the usage of the anchor word. In a different embodiment, however, only the anchor word would be analyzed, e.g., a basic vocabulary learning system.

At step 1004, related or derivative words associated with the anchor word are determined. In an embodiment, the related words may be determined using a particular source, e.g., a book, article, publication. In one embodiment, the user may be able to designate a source, e.g., a dictionary, a novel, a research paper, etc. that is analyzed. The source is analyzed to either determine words related to the anchor word or topics related to the anchor topic.

At step 1006, the anchor word and related words are displayed in a graphical user interface wherein the related words are clustered around the anchor word (as shown in FIG. 2 and FIG. 3, for example).

At step 1008, the anchor words (or topics) are connected to the related words (or topics). For example, the connections may be made via arrows, lines, etc.

At step 1010, a list of similar and dissimilar words (e.g., synonyms and antonyms) or topics may be added to each of the related words. Subsequently, at step 1012, the list of similar or dissimilar words or topics may be displayed adjacent to each of the related words in the GUI. Alternatively, they may be connected to the related words or topics using lines, arrows, etc.

Figure 11:
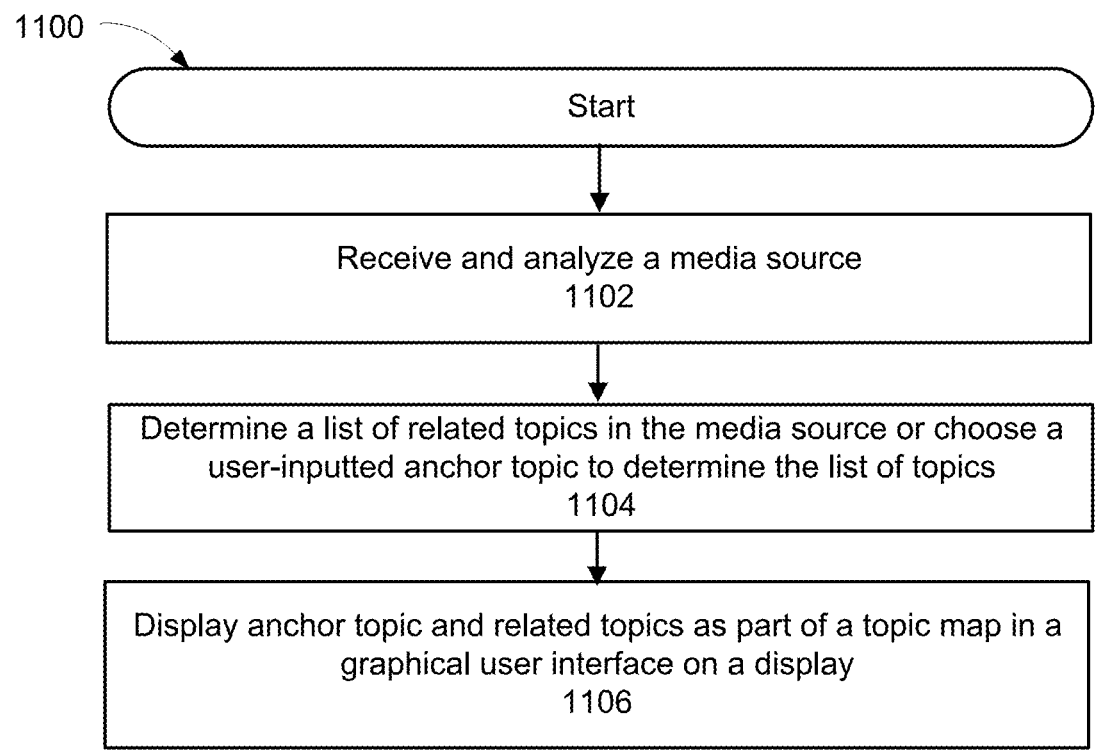
FIG. 11 illustrates a flowchart of an exemplary computer implemented process for analyzing the content of a media source and constructing a visualized topic map in accordance with an embodiment of the present invention.

FIG. 11 illustrates a flowchart of an exemplary computer implemented process for analyzing the content of a media source and constructing a visualized topic map in accordance with an embodiment of the present invention.

At step 1102, an ingestion engine (see, e.g., 902 in FIG. 9) receives a media source and an analysis engine (e.g., 904 in FIG. 9) analyzes the media source, e.g., a book, an article, etc.

At step 1104, the analysis engine determines a list of related topics to the media source ingested. In an embodiment, the analysis engine may also be able to determine a list of related topics that are two or three generations removed from an anchor topic selected by a user. In a different embodiment, the list of related topics is determined using a user-inputted anchor topic.

At step 1106, the anchor topic is displayed along with related topics as part of a topic map in a GUI on a display (e.g. similar to the topic map of FIG. 8). There may be several ways to arrange the information in the GUI. The related topics and other respective similar and dissimilar topics may be clustered around the anchor topic. The topics may also be presented as part of a map similar to the one shown in FIG. 8.

Figure 12:
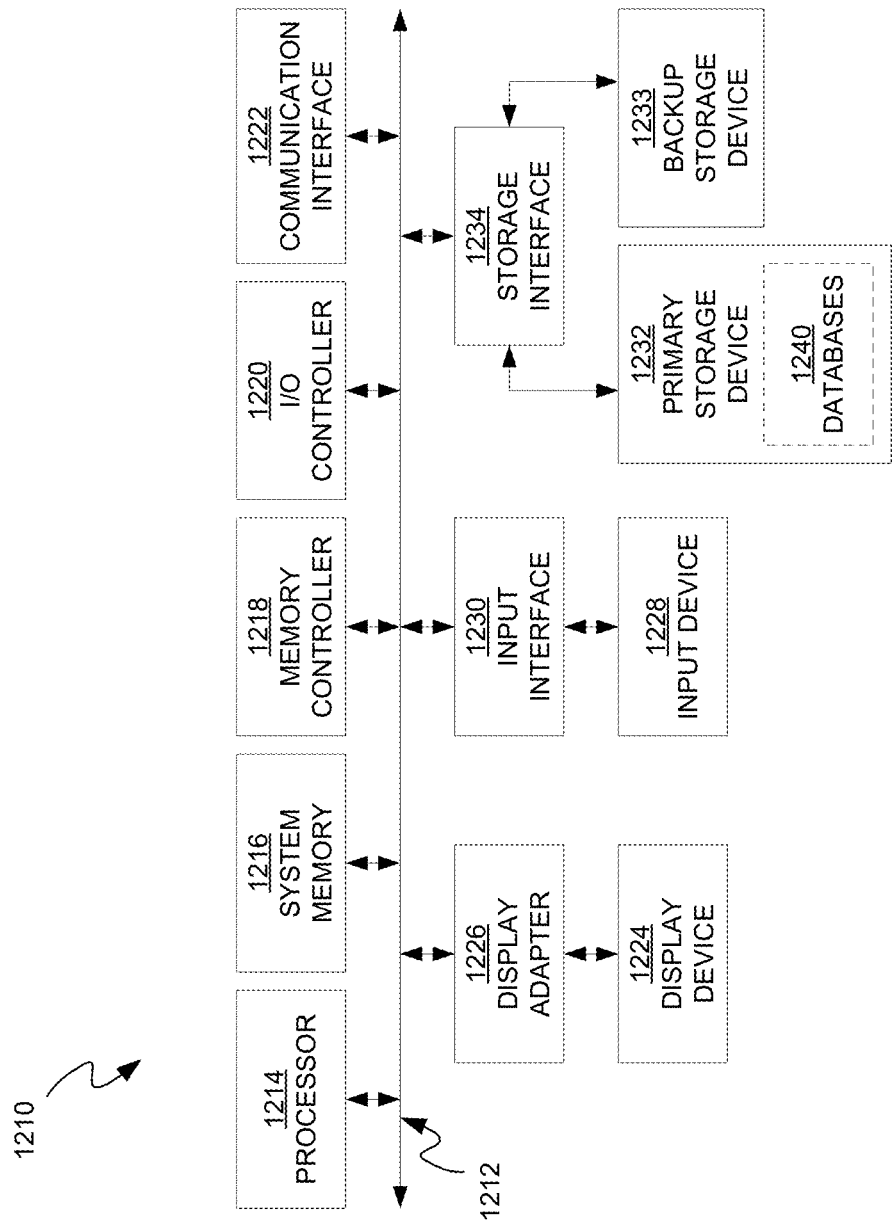
FIG. 12 is a block diagram of an example of data association and linking system that determines relevant words or topics from an anchor topic and displays them in a GUI in accordance with embodiments of the present invention.

FIG. 12 is a block diagram of an example of data association and linking system that determines relevant words or topics from an anchor topic and displays them in a GUI in accordance with embodiments of the present invention. In an embodiment, the data association and linking system may determine related topics in a media source without requiring the user to input an anchor word or anchor topic. For example, the system may automatically determine a visual topic map of the media source without needing any input from a user. Examples of control system 1210 include, without limitation, workstations, laptops, client-side terminals, servers, distributed computing systems, handheld devices, or any other computing system or device. In its most basic configuration, control system 1210 may include at least one processor 1214 and a system memory 1216.

Processor 1214 generally represents any type or form of processing unit capable of processing data or interpreting and executing instructions. In certain embodiments, processor 1214 may receive instructions from a software application or module. These instructions may cause processor 1214 to perform the functions of one or more of the example embodiments described and/or illustrated herein.

System memory 1216 generally represents any type or form of volatile or non-volatile storage device or medium capable of storing data and/or other computer-readable instructions. Examples of system memory 1216 include, without limitation, RAM, ROM, flash memory, or any other suitable memory device. Although not required, in certain embodiments control system 1210 may include both a volatile memory unit (such as, for example, system memory 1216) and a non-volatile storage device (such as, for example, primary storage device 1232).

Tester control system 1210 may also include one or more components or elements in addition to processor 1214 and system memory 1216. For example, in the embodiment of FIG. 2A, control system 1210 includes a memory controller 1218, an input/output (I/O) controller 1220, and a communication interface 1222, each of which may be interconnected via a communication infrastructure 1212. Communication infrastructure 1212 generally represents any type or form of infrastructure capable of facilitating communication between one or more components of a computing device. Examples of communication infrastructure 1212 include, without limitation, a communication bus (such as an Industry Standard Architecture (ISA), Peripheral Component Interconnect (PCI), PCI Express (PCIe), or similar bus) and a network.

Memory controller 1218 generally represents any type or form of device capable of handling memory or data or controlling communication between one or more components of control system 1210. For example, memory controller 1218 may control communication between processor 1214, system memory 1216, and I/O controller 1220 via communication infrastructure 1212.

I/O controller 1220 generally represents any type or form of module capable of coordinating and/or controlling the input and output functions of a computing device. For example, I/O controller 1220 may control or facilitate transfer of data between one or more elements of control system 1210, such as processor 1214, system memory 1216, communication interface 1222, display adapter 1226, input interface 1230, and storage interface 1234.

Communication interface 1222 broadly represents any type or form of communication device or adapter capable of facilitating communication between example control system 1210 and one or more additional devices. For example, communication interface 1222 may facilitate communication between control system 1210 and a private or public network including additional control systems. Examples of communication interface 1222 include, without limitation, a wired network interface (such as a network interface card), a wireless network interface (such as a wireless network interface card), a modem, and any other suitable interface. In one embodiment, communication interface 1222 provides a direct connection to a remote server via a direct link to a network, such as the Internet. Communication interface 1222 may also indirectly provide such a connection through any other suitable connection.

Communication interface 1222 may also represent a host adapter configured to facilitate communication between control system 1210 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 1222 may also allow control system 1210 to engage in distributed or remote computing. For example, communication interface 1222 may receive instructions from a remote device or send instructions to a remote device for execution.

As illustrated in FIG. 12, control system 1210 may also include at least one display device 1224 coupled to communication infrastructure 1212 via a display adapter 1226. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 12, control system 1210 may also include at least one input device 1228 coupled to communication infrastructure 1212 via an input interface 1230. Input device 1228 generally represents any type or form of input device capable of providing input, either computer- or human-generated, to control system 1210. Examples of input device 1228 include, without limitation, a keyboard, a pointing device, a speech recognition device, or any other input device.

As illustrated in FIG. 12, control system 1210 may also include a primary storage device 1232 and a backup storage device 1233 coupled to communication infrastructure 1212 via a storage interface 1234. Storage devices 1232 and 1233 generally represent any type or form of storage device or medium capable of storing data and/or other computer-readable instructions. For example, storage devices 1232 and 1233 may be a magnetic disk drive (e.g., a so-called hard drive), a floppy disk drive, a magnetic tape drive, an optical disk drive, a flash drive, or the like. Storage interface 1234 generally represents any type or form of interface or device for transferring data between storage devices 1232 and 1233 and other components of control system 110.

In one example, databases 1240 may be stored in primary storage device 1232. Databases 1240 may represent portions of a single database or computing device or it may represent multiple databases or computing devices. For example, databases 1240 may represent (be stored on) a portion of control system 1210. Alternatively, databases 1240 may represent (be stored on) one or more physically separate devices capable of being accessed by a computing device, such as control system 1210.

Continuing with reference to FIG. 12, storage devices 1232 and 1233 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1232 and 1233 may also include other similar structures or devices for allowing computer software, data, or other computer-readable instructions to be loaded into control system 1210. For example, storage devices 1232 and 1233 may be configured to read and write software, data, or other computer-readable information. Storage devices 1232 and 1233 may also be a part of control system 1210 or may be separate devices accessed through other interface systems.

Many other devices or subsystems may be connected to control system 1210. Conversely, all of the components and devices illustrated in FIG. 12 need not be present to practice the embodiments described herein. The devices and subsystems referenced above may also be interconnected in different ways from that shown in FIG. 12. Control system 1210 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into control system 1120. All or a portion of the computer program stored on the computer-readable medium may then be stored in system memory 1216 and/or various portions of storage devices 1232 and 1233. When executed by processor 1214, a computer program loaded into control system 1210 may cause processor 1214 to perform and/or be a means for performing the functions of the example embodiments described and/or illustrated herein. Additionally or alternatively, the example embodiments described and/or illustrated herein may be implemented in firmware and/or hardware.

Embodiments according to the invention are thus described. While the present disclosure has been described in particular embodiments, it should be appreciated that the invention should not be construed as limited by such embodiments, but rather construed according to the below claims.

Any combination of the above features and options could be combined into a wide variety of embodiments. It is, therefore, apparent that there is provided in accordance with the present disclosure, systems and methods for interfacing, linking, and presenting associated data, and in particular in one preferred embodiment of vocabulary learning. While this invention has been described in conjunction with a number of embodiments, it is evident that many alternatives, modifications, and variations would be, or are apparent to, those of ordinary skill in the applicable arts. Accordingly, applicants intend to embrace all such alternatives, modifications, equivalents and variations that are within the spirit and scope of this invention.

What is claimed is:

1. A non-transitory computer-readable medium having computer-readable program code embodied therein for causing a computer system to perform a method of linking data with related and unrelated data, the method comprising:
   receiving and analyzing an anchor topic;
   determining one or more related or unrelated topics to the anchor topic using one or more data sources;
   displaying the anchor topic and the one or more related or unrelated topics in a graphical user interface (GUI) in a display, wherein the one or more related or unrelated topics are connected to the anchor topic, and
   displaying a number of occurrences for each of the anchor topic and the one or more related or unrelated topics alongside a respective topic.

2. The non-transitory computer-readable medium of claim 1, wherein the one or more data sources includes a book, a newspaper article, a periodical, a magazine, and a plurality of books.

3. The non-transitory computer-readable medium of claim 1, wherein the method further comprises:
   connecting the anchor topics with the one or more related or unrelated topics in the GUI using a topic map.

4. The non-transitory computer-readable medium of claim 1, wherein the method further comprises:
   creating a plurality of similar topics for each of the one or more related topics and creating a plurality of dissimilar topics for each of the one or more related topics; and
   displaying a respective plurality of similar topics and a respective plurality of dissimilar topics for each related topic in the GUI.

5. The non-transitory computer-readable medium of claim 1, wherein the analyzing an anchor topic comprises analyzing a context within the one or more data sources within which the anchor topic was used.

6. The non-transitory computer-readable medium of claim 1, further comprising:
   receiving and analyzing an anchor word;
   determining one or more related words to the anchor word using one or more data sources; and
   displaying the anchor word and the one or more related words in a graphical user interface (GUI) in a display, wherein the one or more related words are clustered around the anchor word.

7. The non-transitory computer-readable medium of claim 6, further comprising:
   connecting the anchor word with the one or more related words in the GUI.

8. The non-transitory computer-readable medium of claim 7, further comprising:
   creating a plurality of similar words for each of the one or more related words and creating a plurality of dissimilar words for each of the one or more related words; and
   displaying a respective plurality of similar words and a respective plurality of dissimilar words for each related word in the GUI.

9. The non-transitory computer-readable medium of claim 6, wherein the displaying further comprises:
   displaying a respective plurality of similar words and a respective plurality of dissimilar words adjacent to each related word in the GUI.

10. The non-transitory computer-readable medium of claim 6, wherein the analyzing an anchor word comprises analyzing a context within the one or more data sources within which the anchor word was used.

11. The non-transitory computer-readable medium of claim 6, wherein the anchor word and each of the one or more related words in the graphical user interface (GUI) comprises a hyperlink, wherein a user may click on a respective hyperlink to receive further information pertaining to a word.

12. The non-transitory computer-readable medium of claim 1, wherein the anchor topic and each of the one or more related topics in the graphical user interface (GUI)

comprises a hyperlink, wherein a user may click on a respective hyperlink to receive further information pertaining to a word.

\* \* \* \* \*